(12) United States Patent
Axmear

(10) Patent No.: US 7,255,148 B1
(45) Date of Patent: Aug. 14, 2007

(54) TIRE DERIMMING DEVICE AND METHOD

(75) Inventor: Alan Axmear, Keswick, IA (US)

(73) Assignee: Axmear Fabricating Services, Inc., Keswick, IA (US)

( * ) Notice: Subject to any disclaimer, the term of this patent is extended or adjusted under 35 U.S.C. 154(b) by 0 days.

(21) Appl. No.: 11/459,755

(22) Filed: Jul. 25, 2006

Related U.S. Application Data

(60) Provisional application No. 60/595,828, filed on Aug. 9, 2005.

(51) Int. Cl.
*B60C 25/132* (2006.01)
*B60B 29/00* (2006.01)
(52) U.S. Cl. .................... 157/1.17; 157/1.33
(58) Field of Classification Search ............... 157/1.1, 157/1.13, 1.17, 1.26, 1.33, 1.35, 2, 11
See application file for complete search history.

(56) References Cited

U.S. PATENT DOCUMENTS

| 3,003,544 A | | 10/1961 | Foster |
| 3,156,289 A | | 11/1964 | Dragoo et al. |
| 3,266,548 A | * | 8/1966 | Kolosowsky ............... 157/1.33 |
| 3,354,928 A | | 11/1967 | Copeland et al. |
| 3,701,375 A | * | 10/1972 | Dixson et al. ............. 157/1.33 |
| 3,739,831 A | * | 6/1973 | Smith ........................ 157/1.28 |
| 3,807,478 A | * | 4/1974 | Mott ......................... 157/1.33 |
| 4,079,769 A | * | 3/1978 | Sept, Sr. .................... 157/1.26 |
| 4,256,162 A | | 3/1981 | Lacko, Sr. |
| 4,306,606 A | * | 12/1981 | Grasso ....................... 157/1.1 |
| 4,945,968 A | | 8/1990 | Bradburn |
| 5,495,882 A | | 3/1996 | Trant |
| 5,678,621 A | | 10/1997 | Trant |
| 6,131,637 A | | 10/2000 | Pederson |

* cited by examiner

*Primary Examiner*—David B Thomas
(74) *Attorney, Agent, or Firm*—Ryan N. Carter

(57) ABSTRACT

The present invention is a tire derimming device adapted to separate the rubber portion of a tire from its rim and ring. The derimming device generally comprises a power actuator that contacts and bends the rim until the bead pops from the rim and the rim falls out of the tire thereby separating the rim from the ring. The device further comprises a shearing assembly for cutting the rubber portion of the tire into multiple pieces after the rim has been removed from the tire.

16 Claims, 8 Drawing Sheets

TIRE DERIMMING DEVICE AND METHOD

The present patent application claims priority of provisional patent application 60/595,828 which was filed on Aug. 9, 2005 and is hereby expressly incorporated by reference.

BACKGROUND OF THE INVENTION

The invention relates to the field of tire derimming and tire shredding devices. More specifically, the invention relates to a tire derimming device capable of derimming split rim tires and/or non-split rim tires, and then shredding the derimmed tire.

Tire derimming machines that deform metal rims to remove them from the tires mounted thereon have been in use for a number of years by junk yards and resource reclamation facilities. In the case of smaller automobile tires, the job is burdensome but not generally dangerous to the operator. However, where the much larger and heavier truck tires are concerned, there is a real danger of physical injury to the operator due to the split rim component of the tire that can eject from the tire at a high rate of speed causing serious injury or even death.

Large truck tires have a heavy bead in order to support the heavy loads carried by the trucks. The heavy bead does not allow the rubber tire to be removed from the rim without damage to the tire. Split rims solve this problem by allowing the heavy beaded tire to be removed from the rim without having to use damaging force to pull the tire over the bead. The split rims consist of a two part removable ring on the outside rim that allows the tire to be removed from the rim when the ring is removed from the rim. The split rim (also called a ring) is under a considerable amount of pressure and is therefore dangerous to remove because the ring is barely held by the rim and therefore can fly off of the tire at a high rate of speed if it is not properly aligned. Many people have been injured and killed by ejected rings while changing truck tires. Mechanic's shops that work on split rim tires usually do so inside of a small metal cage due to the danger that the ring may be ejected from the rim.

U.S. Pat. No. 4,945,968 discloses a tire derimming device that has a vertically actuated power cylinder which pushes the metal rim out from the center of the tire. One problem with this device is that it does not work on split rim tires because the downward force of the power actuator does not separate the rim from the ring. Therefore, the rim and ring tear through and are ejected from the tire while the rim and ring are still combined. As discussed above, the ring is delicately combined with the rim under pressure, and, therefore, the ring could forcibly eject from the rim even after they are pushed through the tire by the power actuator.

Applicant is not aware of any device that provides a simple and easy method for derimming semi-truck tires mounted on split rims. Therefore, there is a need for a tire derimming device that is capable of safely separating the tire, ring, and rim of a split rim tire.

SUMMARY OF THE INVENTION

The present invention is a tire derimming device adapted to separate the rubber portion of a tire from its rim and ring. The derimming device may generally comprise a base having a top portion, a press, a first power actuator, a second power actuator, and a shearing assembly. The first and second power actuators perform derimming operations on different kinds of tires, as is described below. The shearing assembly slices the rubber portion of the tires into smaller pieces after the rim and ring have been removed therefrom.

A first power actuator is for derimming tires that have rims, but do not have split rims (rings). These types of tires are usually found on cars and pick-up trucks. The first power actuator operates in a generally vertical direction. In use, the tire is placed on the base of the device, which is a generally flat surface with an opening in the middle which is large enough for the tire rim to fall through once it is pushed from the middle of the tire by the power actuator. The air stem of the tire is cut so as to relieve the air pressure inside the tire and make the derimming process safer. A press is actuated to bear down on and secure the deflated tire to the base. As the press secures the tire to the base, the first power actuator is actuated downward toward the rim so that the power actuator pushes the rim until the bead pops from the rim. The power actuator continues downward until the rim falls out of the tire and through the hole in the base. After the tire is separated from the rim, the rubber portion of the tire can be cut into pieces using the shearing portion of the device, as is described below.

A second power actuator is for derimming split rim tires and tires with bud rims, such as semi-truck tires. The second power actuator is positioned so that it contacts the tire's rim at an angle. The power actuator pushes so as to deform the rim inward and away from the ring allowing the rim to safely separate from the ring and tire, thereby diminishing the potential for the ring to eject from the tire with unexpected explosive force.

In use, the second power actuator operates similarly to the above described first power actuator, except that it contacts the rim at an angle. The tire is placed on the base of the device with its ring facing upward. The air stem is cut so as to relieve pressure inside the tire and make the derimming process safer. The press is actuated to bear down on a portion of the deflated tire and secure it to the base of the device. The tip of the angled power actuator has a groove adapted to grip the lip of the tire's rim. The positioning of the grooved tip of the second power actuator on the edge of the tire rim is important because the angled power actuator serves a safety function to protect users and bystanders if the ring is forcefully ejected from the tire. The second power actuator extends through the center of the ring so that if the ring were to forcefully eject from tire, the power actuator would limit the distance the ring could travel since the ring would be around the power actuator.

The power actuator continues downward at an angle so that it bends the rim until the bead pops from the rim and the rim falls out of the tire through the hole in the base. After the rim is separated from the ring and removed from the tire, the ring can be removed from the tire by hand without fear of explosive force. After the tire is separated from the rim, the rubber portion of the tire can be cut into pieces using the shearing portion of the device, as is described below.

In addition to the derimming mechanisms described above, the device of the present invention may further comprise a shearing assembly for cutting the rubber portion of the tire after it has been separated from the ring and rim. The shearing assembly preferably comprises at least one top blade and two bottom blades for cutting the tire. The top blade is pivotally mounted to the device and combined with a power actuator so that actuation of the power actuator causes the top blade to move downward toward the two bottom blades in a scissor-like fashion. The two bottom blades are combined with the base of the assembly and serve to align the top blade as it moves toward the bottom blades to ensure the blades are close enough together to cut the tires. In use, after the tire is separated from its ring and its rim, the rubber portion of the tire is placed on the base of the device between the top blade and two lower blades. The power actuator actuates the top blade and causes it to move toward the bottom blades thereby cutting the tire into multiple pieces.

The present invention is advantageous over prior art tire derimmers because it allows the safe removal of rims and rings from heavy duty truck tires. Further, the preferred embodiment allows the derimming operation and the shearing operation to be conveniently combined in one machine.

DESCRIPTION OF THE PREFERRED EMBODIMENT OF THE INVENTION

Figure 1:
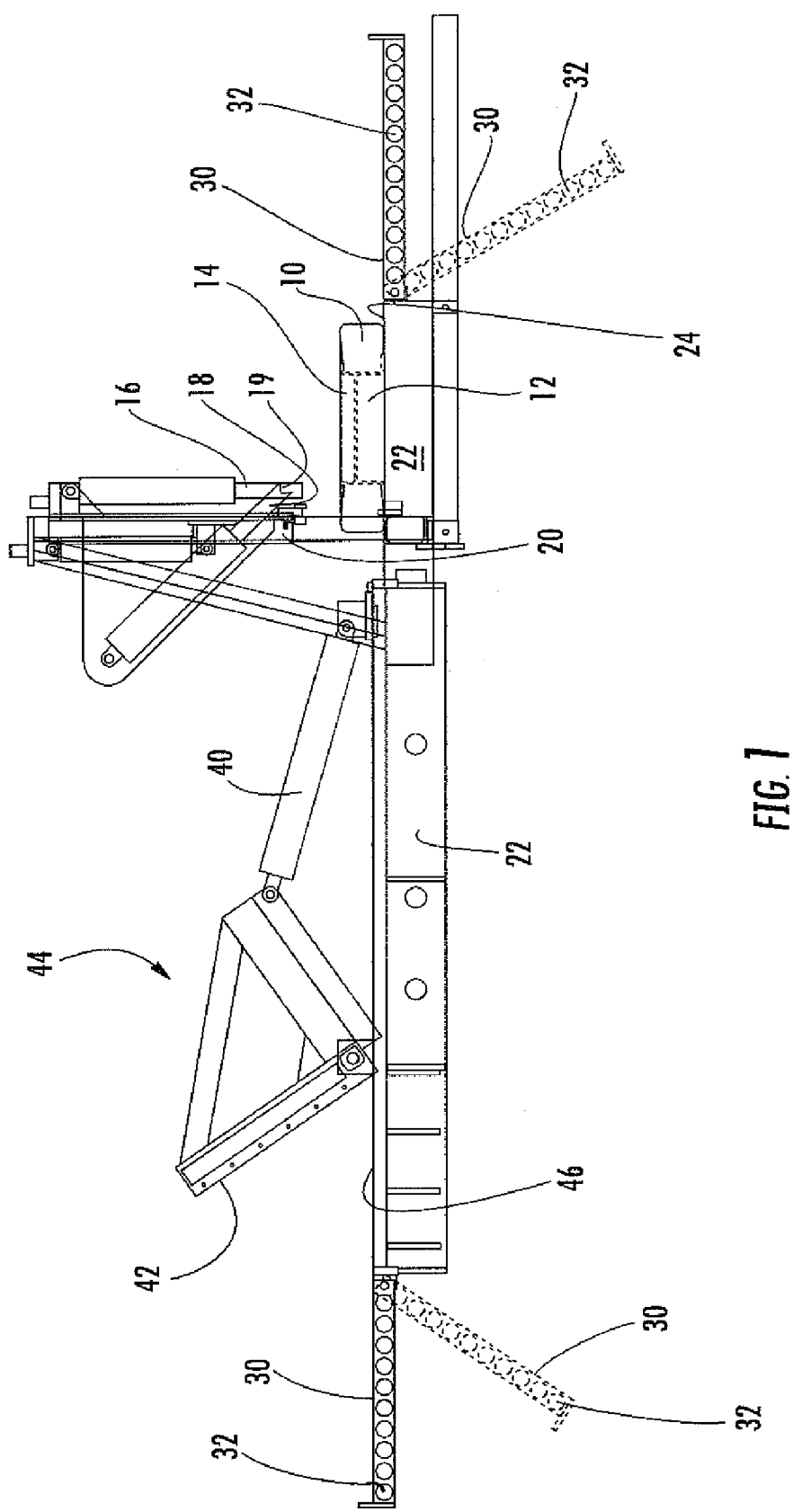
FIG. 1 is a side view of the present invention showing the first and second power actuators, the press, and the shearing assembly in the retracted position.

The present invention is a tire derimming device adapted to separate the rubber portion of a tire 10 from its rim 12 and ring 14. As seen in FIG. 1, the derimming device may generally comprise a base 22, a press 20, a first power actuator 16, and a second power actuator 18. The first and second power actuators, 16, 18 perform derimming operations on different kinds of tires, as is further described below. The first and second power actuators 16, 18 are preferably hydraulic cylinders, however any suitable means may be used to actuate them, including pneumatic power.

Figure 2:
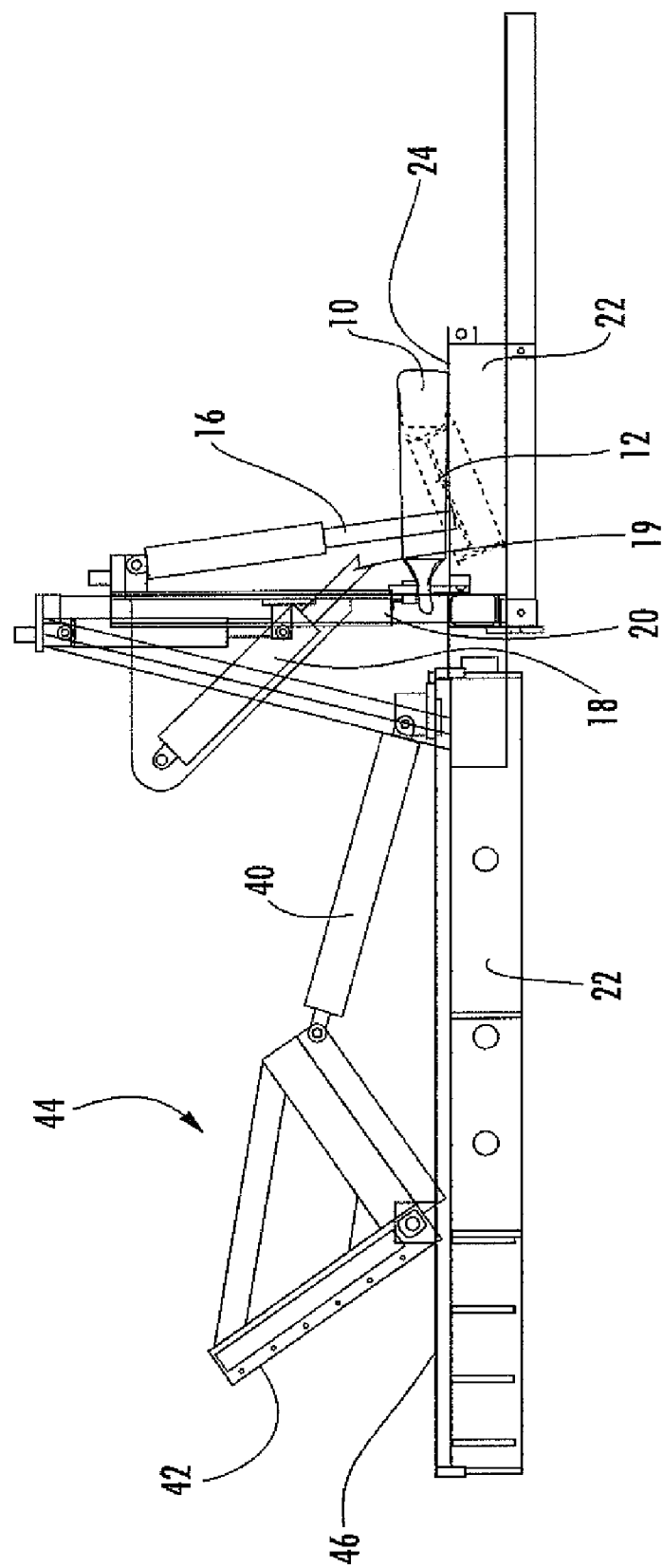
FIG. 2 is a side view of the present invention showing the press in its actuated position holding the tire against the top of the base and the first power actuator in its actuated position pushing out the tire's rim.
Figure 4:
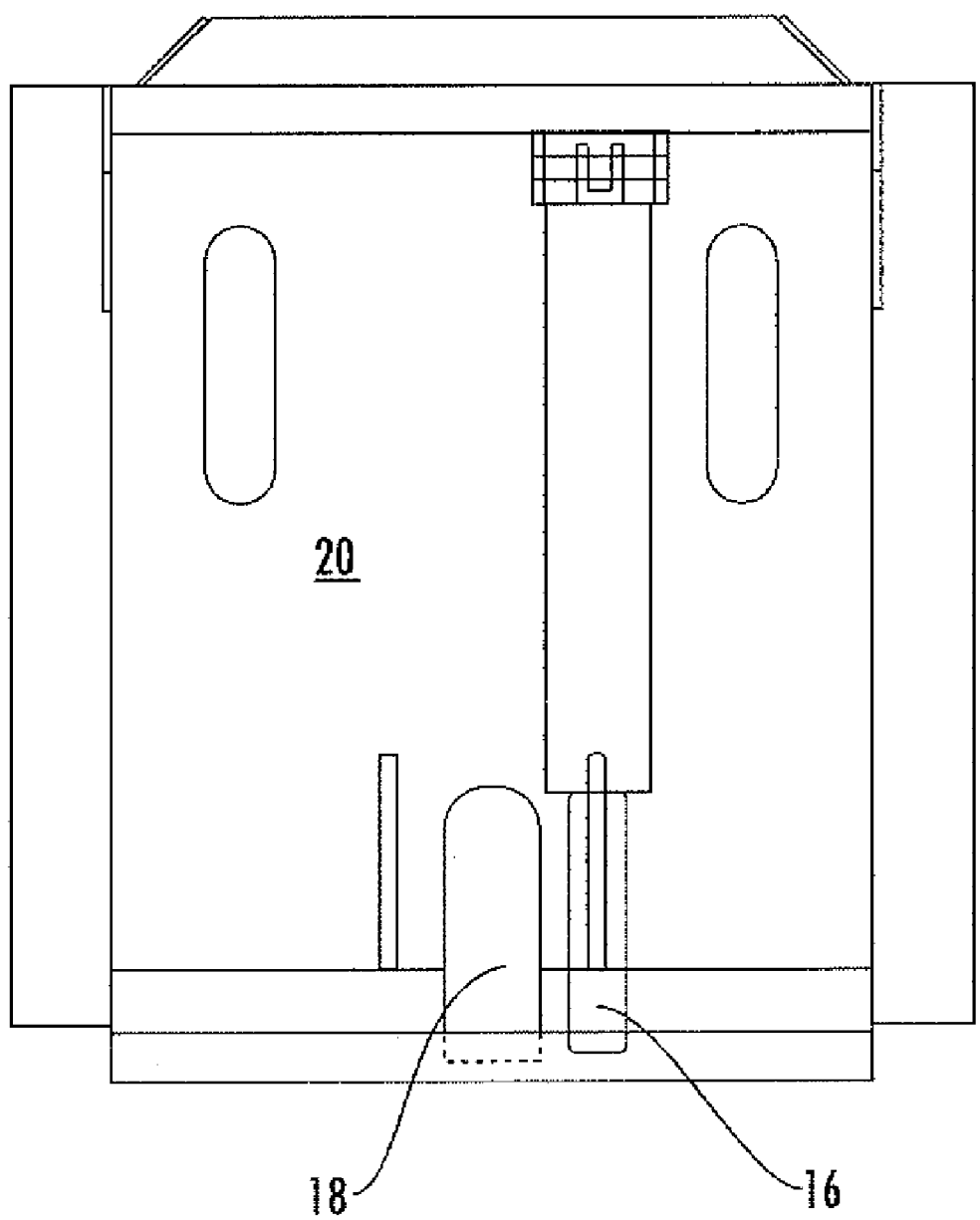
FIG. 4 is a front view of the press assembly.

FIGS. 1 and 2 show a first embodiment wherein the first power actuator 16 is used to de-rim ordinary car and pick-up truck tires 10 that have rims 12, but do not have rings 14. The first power actuator 16 operates in a generally vertical direction to push the tire's 10 rim 12 out from the center of the tire 10. As seen in FIG. 1, the tire 10 is laid on the top 24 portion of the base 22. The top 24 of the base 22 is a generally flat surface with an opening in the middle large enough for the tire rim 12 to fall through after it is pushed from the tire 10 by the power actuator 16. FIG. 1 shows the first power actuator 16 and the press 20 in their retracted position. FIG. 4 shows an end view of the press 20. The press 20 is preferably a rectangular shaped ram that forcefully presses the tire 10 against the top 24 of the base 22. It should be noted that the press 20 can be any suitable shape as long as it holds the tire 10 in place during the derimming operation. FIG. 2 shows the press 20 in its actuated position pressing down on and securing the tire 10 to the top 24 of the base 22. The preferred positioning of the tire 10 on the top 24 of the base 22 is to place the tire 10 under the press 20 so that the press 20 in its actuated position narrowly misses the tire's 10 rim 12. This allows the press 20 to firmly hold the tire 10 against the base 22. The top portion 24 of the base 22 is laterally adjustable to ensure that the press 20 contacts different sized tires 10 at the proper position.

FIG. 2 shows the first power actuator 16 contacting and pushing the rim 12 out from the middle of the tire 10. The power actuator 16 continues pushing downward until the rim 12 falls out of the tire 10 through the hole in the base 22. After the tire 10 is separated from the rim 12, the rubber portion of the tire 10 can be cut into pieces using the shearing assembly 44 of the device, as is described below.

Figure 3:
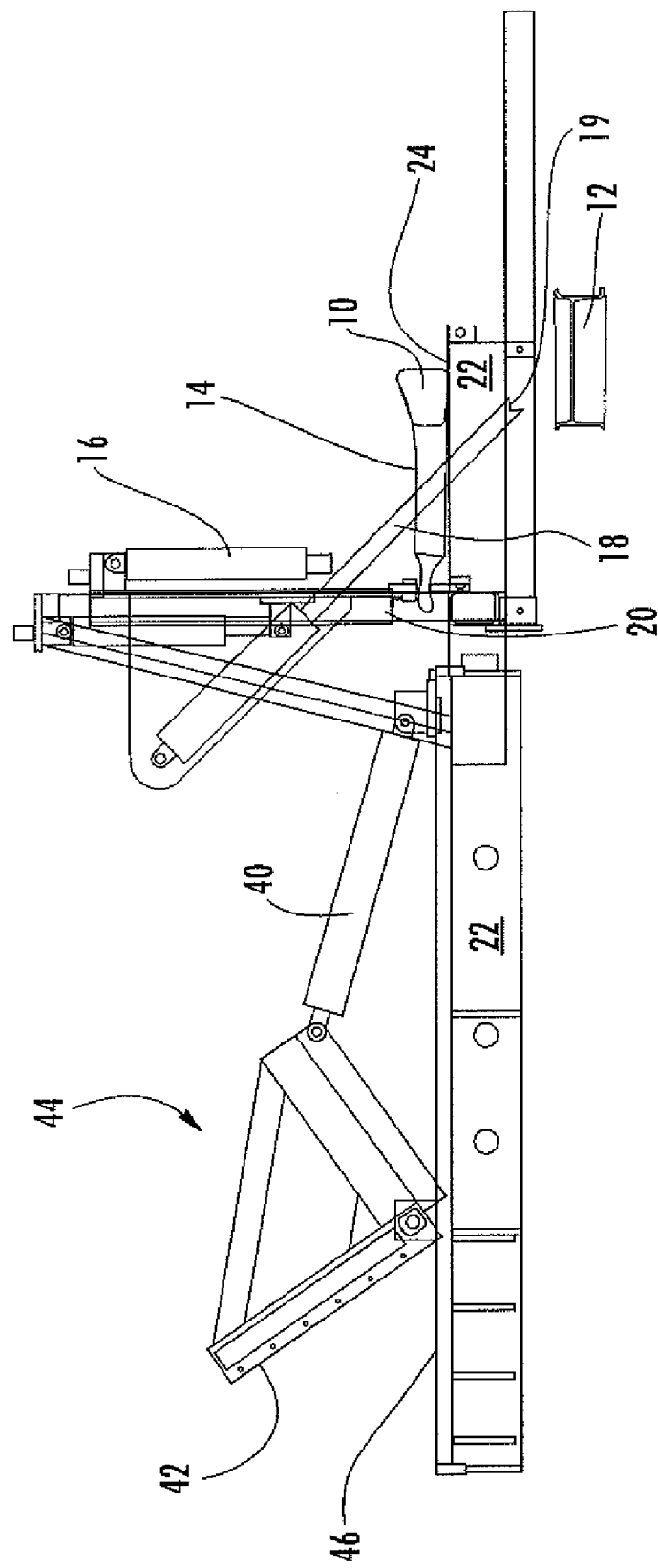
FIG. 3 is a side view of the present invention showing the press in its actuated position holding the tire against the top of the base and the angled power actuator fully extended after the tire's rim has been pushed out of the tire.
Figure 8:
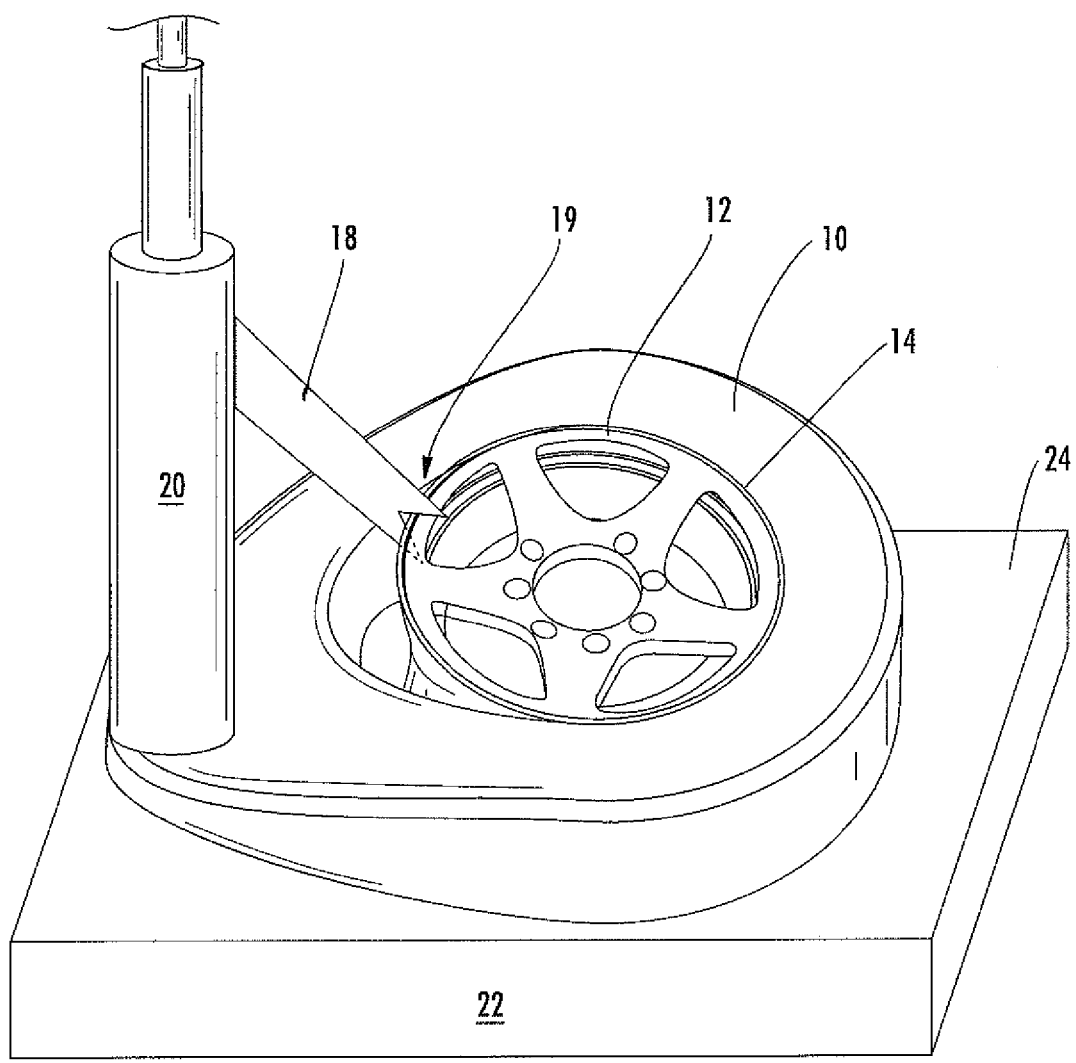
FIG. 8 is a top prospective view showing the grooved tip of the second power actuator contacting the tire rim.

FIGS. 1, 3, and 8 show a second embodiment wherein the second power actuator 18 is used for derimming split rim tires and/or tires with bud rims, such as heavy duty semi-truck tires 10. As seen in FIGS. 1, 3, and 8, the second power actuator 18 is positioned so that it contacts the rim 12 at an angle. In one embodiment, the second power actuator 18 contacts the rim 12 at an angle between thirty and sixty degrees with the preferred angle being forty-five degrees. The second power actuator 18 contacts the rim 12 so as to separate the rim 12 from the ring 14 without tearing the tire 10. As discussed in the Background section of this specification, tearing the tire 10 may cause the rim 12 and ring 14 to be pushed out of the tire 10 together, in which case the ring 14 would retain the potential for ejecting from the rim 12 with explosive force. In the present invention, the second power actuator 18 deforms the rim 12 inward and away from the ring 14 allowing the rim 12 to separate safely from the ring 14 and tire 10.

As discussed above, the angle that the second power actuator 18 deforms the rim 12 is designed to separate the rim 12 from the ring 14 and thereby remove the dangerous potential energy stored in the ring 14. However, even if the ring 14 were to eject from the rim 12 during a derimming operation, the alignment of the second power actuator 18 would prevent the ring 14 from forcefully and dangerously ejecting from the tire 10 because the power actuator 18 extends through the ring 14 as it pushes out the rim 12. In other words, as shown in FIGS. 3 and 8, as the grooved tip 19 of the second power actuator 18 pushes the rim 12 through the tire 10, the ring 14 is around the power actuator 18 so that even if the ring 14 were to eject, its travel would be limited by the power actuator 18.

The operation of the second power actuator 18 is similar to the operation of the first power actuator 16 described above. FIG. 1 shows the second power actuator 18 and the press 20 in their retracted position. The tire 10 is placed on the top 24 of the base 22 with the ring 14 facing upward. In all embodiments it is preferable to cut the air stem of the tire before performing the derimming operation so as to relieve pressure inside the tire and make the derimming process safer. The press 20 is actuated to press down on a portion of the deflated tire and secure it to the top 24 of the base 22 of the device. FIGS. 2 and 8 show the press 20 in its extended position squeezing and holding the tire 10 against the top 24 of the base 22. The proper positioning of the tire 10 under the press 20 is described above.

The tip 19 of the angled power actuator 18 preferably has a groove adapted to grab the lip of the tire's rim 12. As seen best in FIG. 8, the angled power actuator 18 is actuated so that the tire's rim 12 is placed inside the grooved tip 19. The second power actuator 18 continues downward so that it bends the rim 12 until the bead pops from the rim 12. The power actuator 18 continues until the rim 12 falls out of the tire 10, as is seen in FIG. 3. Removing the rim 12 from the tire 10 releases the pressure on the ring 14 so that it no longer has the potential to eject from the tire 10 with explosive force. After the rim 12 is removed from the tire 10, the ring 14 can be easily removed and disposed of. After the tire 10 is separated from the rim 12, the rubber portion of the tire 10 can be cut into pieces using the shearing mechanism of the device, as is described below.

The first embodiment described above is primarily for use with the first power actuator 16. The second embodiment described above is primarily for use with the second power actuator 18. However, it should be noted that if additional power is needed to remove a rim 12 in either embodiment, the unused power actuator may be used to assist the primary power actuator so that both power actuators 16, 18 are employed at the same time (in the embodiments in which the device comprises both power actuators 16, 18).

Figure 5:
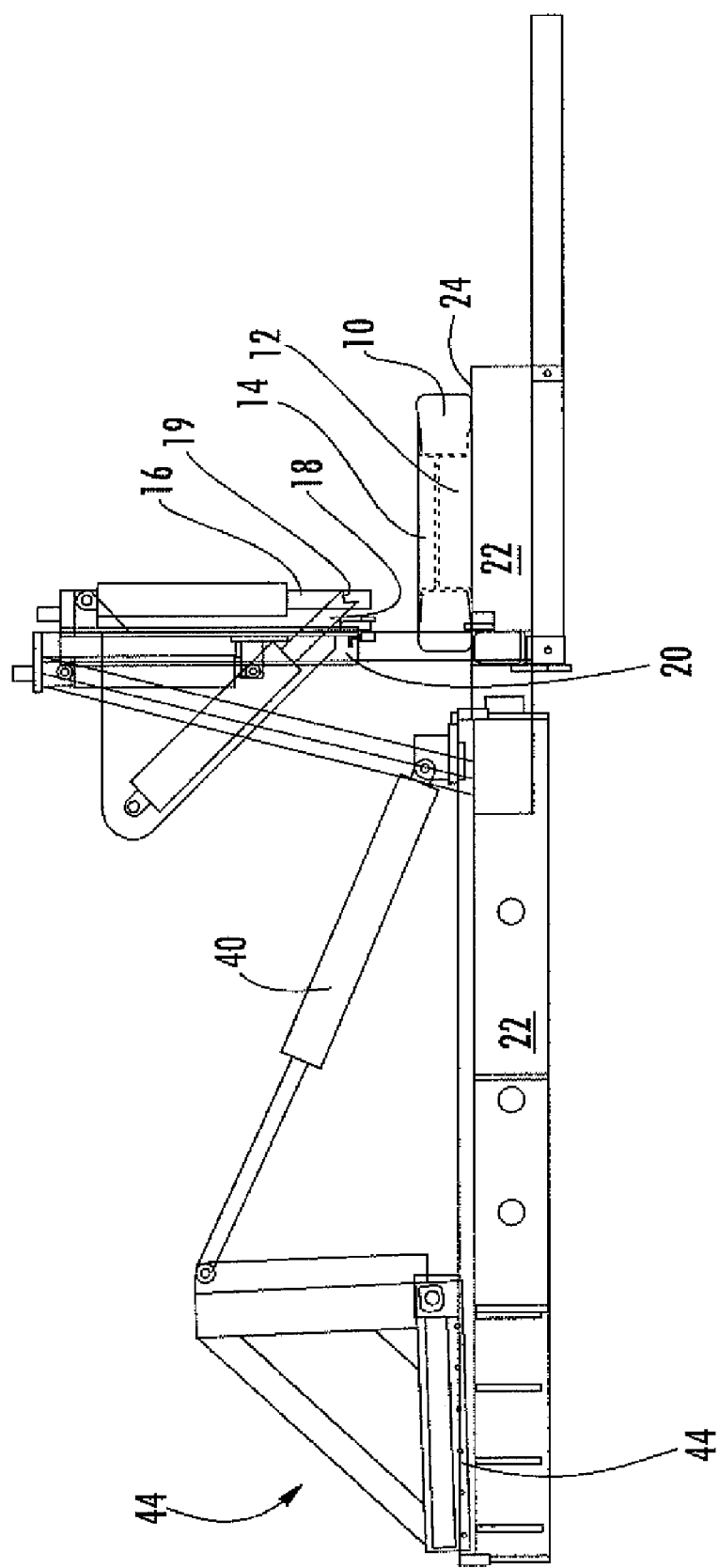
FIG. 5 is a side view of the present invention showing the shearing assembly in its actuated position.

In addition to the derimming mechanisms described above, some embodiments of the device of the present invention may further comprise a shearing assembly 44 for cutting the rubber portion of the tire 10 into multiple pieces after it has been separated from the ring 14 and rim 12. The shearing assembly 44 generally comprises at least one upper blade 42 and one lower blade 46. In the preferred embodiment shown in FIG. 7, there are two upper blades 42 and two lower blades 46. As seen in FIGS. 1 and 5, the upper blades 42 are pivotally mounted to the device so that actuation of a power actuator 40 causes the upper blades 42 to move downward toward the two bottom blades 46 in a scissor like motion. The two lower blades 46 are combined with the base 22 of the assembly and serve to align the upper blade 42 as it moves toward the lower blades 46 to ensure the blades 42, 46 are close enough to cut the tire 10. The lower blades 46 are angled downward so as to allow them to be close at the cutting area only. This prevents galling, jamming, or chipping from too much contact area. The shearing assembly 44 further comprises a gripper stud 43 (FIG. 7) which is member protruding from the lower end of the upper blade 42 assembly. The gripper stud 43 contacts the tire 10 and holds the tire 10 in place before the upper blades 42 contact and cut the tire 10. The gripper stud 43 is especially important when the tire 10 is wet and slippery.

In use, after the tire 10 is separated from its ring 14 and its rim 12, the rubber portion of the tire 10 is placed on the base 22 of the device between the upper blades 42 and the two lower blades 46. The power actuator actuates the upper blades 42 and causes them to move toward the lower blades 46. The gripper stud 43 contacts and holds the tire 10 as the upper blades 42 move toward and cut the tire 10 into multiple pieces.

Figure 7:
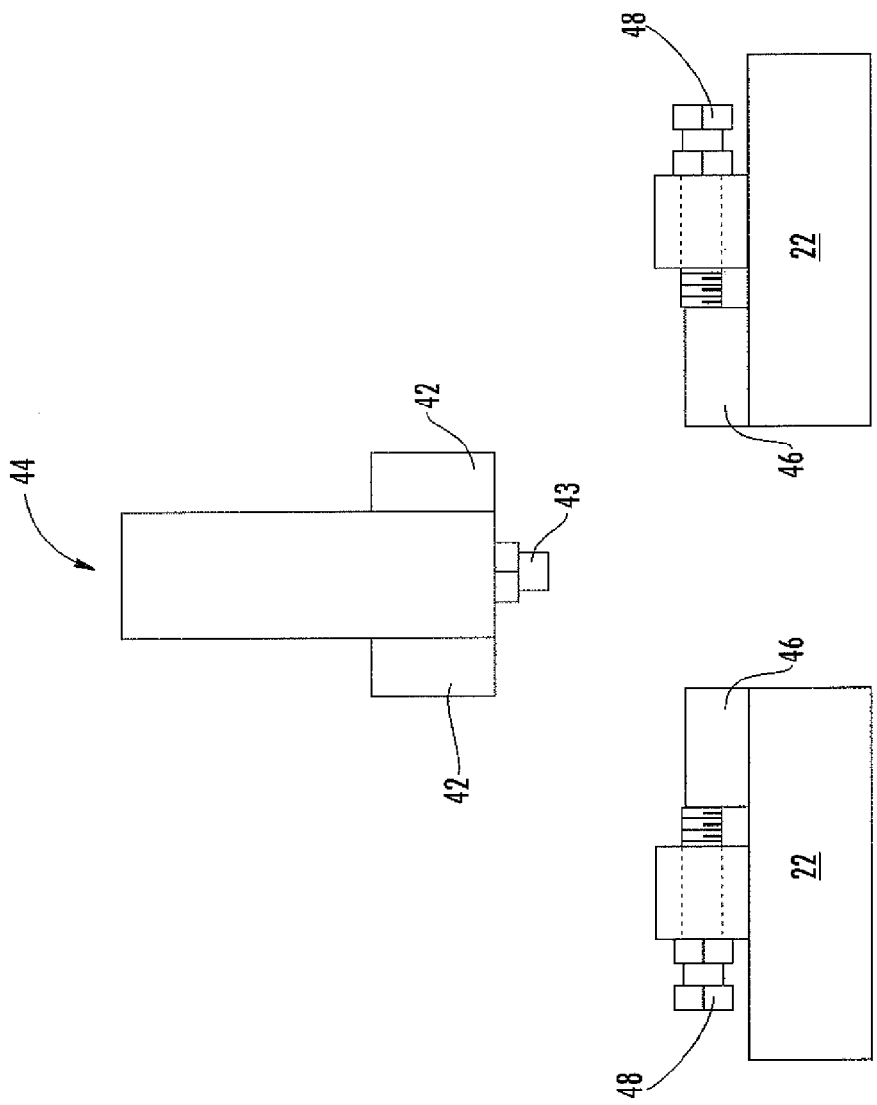
FIG. 7 is an end view showing the blades of the shearing mechanism.

As seen in FIG. 7, the lower blades 46 comprise adjustment means 48. In the preferred embodiment, the adjustment means 48 are screws. The blades 46 are operatively combined with the adjustment means 48 so that rotation of the screws causes the blades 46 to move. Adjustment of the lower blades 46 is desirable to ensure that the blades 42, 46 are properly positioned to cut the tire 10.

As seen in FIG. 1, both the derimmer end of the base 22 and the shearing assembly 44 end of the base 22 comprise pivotally mounted lift gates 30 to aid in lifting the tires onto the base 22. In FIG. 1, the lift gates 30 are shown in their raised position in sold lines and their lowered position in phantom limes. The lift gates 30 are preferably hydraulically actuated so that a tire 10 can be placed on the lift gate 30 in its lowered position and then hydraulically raised upward to the surface of the base 22. Rollers 32 on the lift gate 30 assist in sliding the tire 10 from the lift gate 30 onto the top 24 portion of the base 22 and into position under the press 20 at the derimming end, or under the blades 42 at the shearing assembly 44 end.

Figure 6:
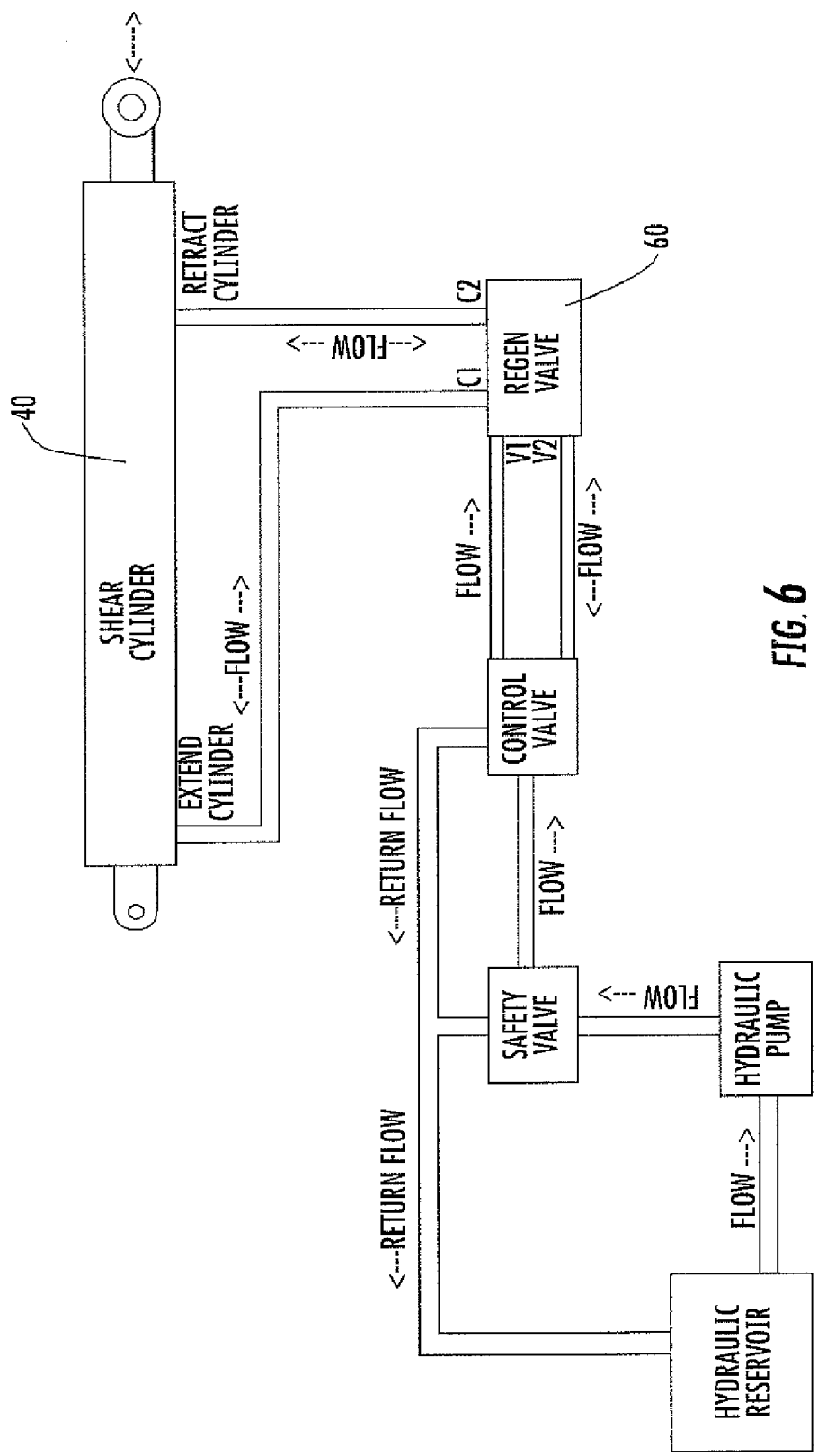
FIG. 6 is a diagram showing the hydraulic flow through the device of the present invention.

As discussed above, the components of the present invention are preferably powered by hydraulic power. FIG. 6 shows a schematic view of the preferred hydraulic system of the present invention. One significant feature of the hydraulic flow is the regeneration ("re-gen") valve 60 which allows the exhaust hydraulic fluid from the shear power actuator 40 to be channeled into the pressure side of that same power actuator 40 until the working pressure reaches about 1500 psi. The fluid is then cycled back into the reservoir. The re-gen valve 60 is adjustable, however, it is preferably set to 1500 psi. At 1500 psi the blade 42 is starting to actually cut the tire and the power actuator 40 needs to have fluid at higher pressure. The re-gen valve 60 stops diverting the return fluid at about 1500 psi and allows higher pressure to build.

In one embodiment shown in FIGS. 1-3, the shearing assembly 44 is combined with the tire derimmer devices so that both devices are mounted onto the same base 22. In this embodiment the hydraulics of the devices are separate so that both the derimmer and the shearing assembly 44 can be operating at the same time. In another embodiment that is not shown in the figures, the tire derimming device is separate unit from the shearing assembly 44. Alternate derimmer embodiments of the device may comprise only the first power actuator 16 or only the second power actuator 18 instead of the combination of the power actuators 16, 18 shown in the figures.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is:

1. A tire derimming device for separating a tire from its rim and ring, said device comprising:
   a base on which the tire rests during the derimming operation;
   a power actuator combined with the base and adapted to extend and retract at an angle relative to the base so that the power actuator contacts the rim and separates it from the ring.

2. A tire derimming device for separating a tire from its rim and ring wherein the tire has an outer portion and a center portion, said device comprising:
   a base on which the tire rests during the derimming operation;
   a power actuator combined with the base and adapted to extend and retract at an angle relative to the base so that the power actuator contacts and pushes the rim downward and toward the center of the tire thereby separating the rim from the ring.

3. The device of claim 1 wherein the power actuator is actuated at an angle of between 30 and 60 degrees relative to the base.

4. The device of claim 1 wherein the power actuator is actuated at an angle of about 45 degrees relative to the base.

5. The device of claim 1 further comprising a second power actuator combined with the base adapted to extend and retract in a generally vertical direction relative to the base for derimming tires without rings.

6. The device of claim 1 wherein the power actuator has a groove at one end adapted to grip the tire's rim during the derimming operation.

7. The device of claim 1 further comprising a press adapted to forcibly contact and hold the tire against the base during the derimming operation.

8. The device of claim 7 wherein the press is vertically actuated.

9. The device of claim 1 further comprising a lift gate pivotally attached to the base for lifting the tire onto the base.

10. The device of claim 9 wherein the lift gate is hydraulically actuated.

11. The device of claim 1 wherein the base comprises a flat surface with an opening in the middle large enough for the rim to fall through once it is pushed from the tire by the power actuator.

12. A tire derimming device for separating a tire from its rim and ring, said device comprising:
- a base on which the tire rests during the derimming operation;
- a power actuator combined with the base and adapted to extend and retract at an angle relative to the base so that the power actuator contacts the rim and separates it from the ring; and
- a shearing assembly combined with a second end of the base for cutting the tire into multiple pieces after separation from the ring.

13. The device of claim 12 wherein the shearing assembly comprises one top blade and two bottom blades.

14. The device of claim 13 wherein the top blade further comprises a gripper stud to help hold the tire in place as it is being cut.

15. The device of claim 12 further comprising a second power actuator combined with the base adapted to extend and retract in a generally vertical direction.

16. The device of claim 12 further comprising a lift gate pivotally attached to the second end of the base for lifting the tire onto the second end of the base.

* * * * *